United States Patent
Kuang et al.

(10) Patent No.: US 10,336,316 B2
(45) Date of Patent: Jul. 2, 2019

(54) CONTROL SYSTEM FOR A CLUTCH DURING A REGENERATIVE BRAKING EVENT

(71) Applicant: FORD GLOBAL TECHNOLOGIES, LLC, Dearborn, MI (US)

(72) Inventors: Ming Lang Kuang, Canton, MI (US); Bernard D. Nefcy, Novi, MI (US); Yanan Zhao, Ann Arbor, MI (US); Daniel Scott Colvin, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 384 days.

(21) Appl. No.: 15/342,386

(22) Filed: Nov. 3, 2016

(65) Prior Publication Data
US 2018/0118194 A1    May 3, 2018

(51) Int. Cl.
*B60W 10/02* (2006.01)
*B60W 20/40* (2016.01)
(Continued)

(52) U.S. Cl.
CPC ............. *B60W 20/40* (2013.01); *B60K 6/387* (2013.01); *B60W 10/02* (2013.01); *B60W 10/06* (2013.01); *B60W 10/08* (2013.01); *B60W 20/00* (2013.01); *B60W 30/18127* (2013.01); *F16D 48/06* (2013.01); *B60K 6/46* (2013.01); *B60W 2520/30* (2013.01); *B60W 2540/10* (2013.01); *B60W 2540/12* (2013.01); *B60W 2710/02* (2013.01); *B60W 2720/28* (2013.01); *B60Y 2200/91* (2013.01); *B60Y 2200/92* (2013.01);
(Continued)

(58) Field of Classification Search
CPC ...... B60W 20/40; B60W 10/02; B60W 10/06; B60W 10/08; B60W 20/00; B60W 30/18127; B60W 2720/28; B60W 2540/12; B60W 2520/30; B60W 2710/02; B60W 2540/10; B60K 6/387; B60K 6/46; F16D 48/06; F16D 2500/7044; F16D 2500/50287; F16D 2500/3115; F16D 2500/10487; F16D 2500/70408; F16D 2500/5122; F16D 2500/31446; F16D 2500/3117; F16D 2500/10412; Y02T 10/6286; Y10S 903/914; Y10S 903/946; B60Y 2200/91; B60Y 2200/92; B60Y 2300/18125; B60Y 2300/421; B60Y 2400/426
See application file for complete search history.

(56) References Cited

U.S. PATENT DOCUMENTS 6,183,389 B1    2/2001    Tabata
7,100,720 B2    9/2006    Ishikawa
(Continued)

*Primary Examiner* — David J Hlavka
(74) *Attorney, Agent, or Firm* — David Kelley; Brooks Kushman, P.C.

(57) ABSTRACT

A vehicle includes an electric machine, battery, torque converter bypass clutch, drive wheel, and controller. The electric machine is configured to recharge the battery via regenerative braking. The torque converter bypass clutch is disposed between the electric machine and the drive wheel. The controller is programmed to, in response to a negative drive wheel torque command during a regenerative braking event, adjust a closed-state torque capacity of the torque converter bypass clutch based on the torque command.

17 Claims, 7 Drawing Sheets

(51) Int. Cl.

| | |
|---|---|
| *B60K 6/387* | (2007.10) |
| *F16D 48/06* | (2006.01) |
| *B60W 10/06* | (2006.01) |
| *B60W 10/08* | (2006.01) |
| *B60W 20/00* | (2016.01) |
| *B60W 30/18* | (2012.01) |
| *B60K 6/46* | (2007.10) |

(52) U.S. Cl.
CPC ............. *B60Y 2300/18125* (2013.01); *B60Y 2300/421* (2013.01); *B60Y 2400/426* (2013.01); *F16D 2500/10412* (2013.01); *F16D 2500/10487* (2013.01); *F16D 2500/3115* (2013.01); *F16D 2500/3117* (2013.01); *F16D 2500/31446* (2013.01); *F16D 2500/50287* (2013.01); *F16D 2500/5122* (2013.01); *F16D 2500/7044* (2013.01); *F16D 2500/70408* (2013.01); *Y02T 10/6286* (2013.01); *Y10S 903/914* (2013.01); *Y10S 903/946* (2013.01)

(56) References Cited

U.S. PATENT DOCUMENTS

| | | | |
|---|---|---|---|
| 7,329,204 B2* | 2/2008 | Senda | B60W 10/02 180/65.265 |
| 8,061,463 B2 | 11/2011 | Kitano et al. | |
| 8,366,210 B2 | 2/2013 | Maki et al. | |
| 9,246,417 B1 | 1/2016 | Connolly et al. | |
| 9,371,061 B2 | 6/2016 | Kim | |
| 2004/0149502 A1* | 8/2004 | Itoh | B60K 6/48 180/65.25 |
| 2016/0059705 A1 | 3/2016 | Kim | |
| 2016/0281804 A1* | 9/2016 | Ando | F16D 48/08 |
| 2018/0056969 A1* | 3/2018 | Tsuda | B60K 6/48 |

* cited by examiner

US 10,336,316 B2

CONTROL SYSTEM FOR A CLUTCH DURING A REGENERATIVE BRAKING EVENT

TECHNICAL FIELD

The present disclosure relates to hybrid/electric vehicles and regenerative braking control methods.

BACKGROUND

Regenerative braking is a feature that may be implemented in hybrid or electric vehicles. Regenerative braking improves fuel economy by recapturing kinetic energy during a braking event. During a braking event that incorporates regenerative braking, a generator converts the kinetic energy of the vehicle into electrical energy which is then used to power various subsystems or is stored a battery.

SUMMARY

A vehicle system includes a controller that is programmed to, in response to a decreasing drive wheel torque command during a regenerative braking event, adjust a closed-state torque capacity of a torque converter bypass clutch, disposed between an electric machine and a drive wheel, based on the torque command and in proportion to negative values of the torque command.

A vehicle includes a powertrain, electric machine, battery, clutch, drive wheel, and controller. The powertrain is configured to transfer kinetic energy to the electric machine to charge the battery during regenerative braking. The clutch is disposed between the electric machine and the drive wheel. The controller is programmed to, in response to a negative drive wheel torque command during a regenerative braking event, adjust a closed-state torque capacity of the clutch based on the torque command.

A vehicle includes an electric machine, battery, torque converter bypass clutch, drive wheel, and controller. The electric machine is configured to recharge the battery via regenerative braking. The torque converter bypass clutch is disposed between the electric machine and the drive wheel. The controller is programmed to, in response to a negative drive wheel torque command during a regenerative braking event, adjust a closed-state torque capacity of the torque converter bypass clutch based on the torque command.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
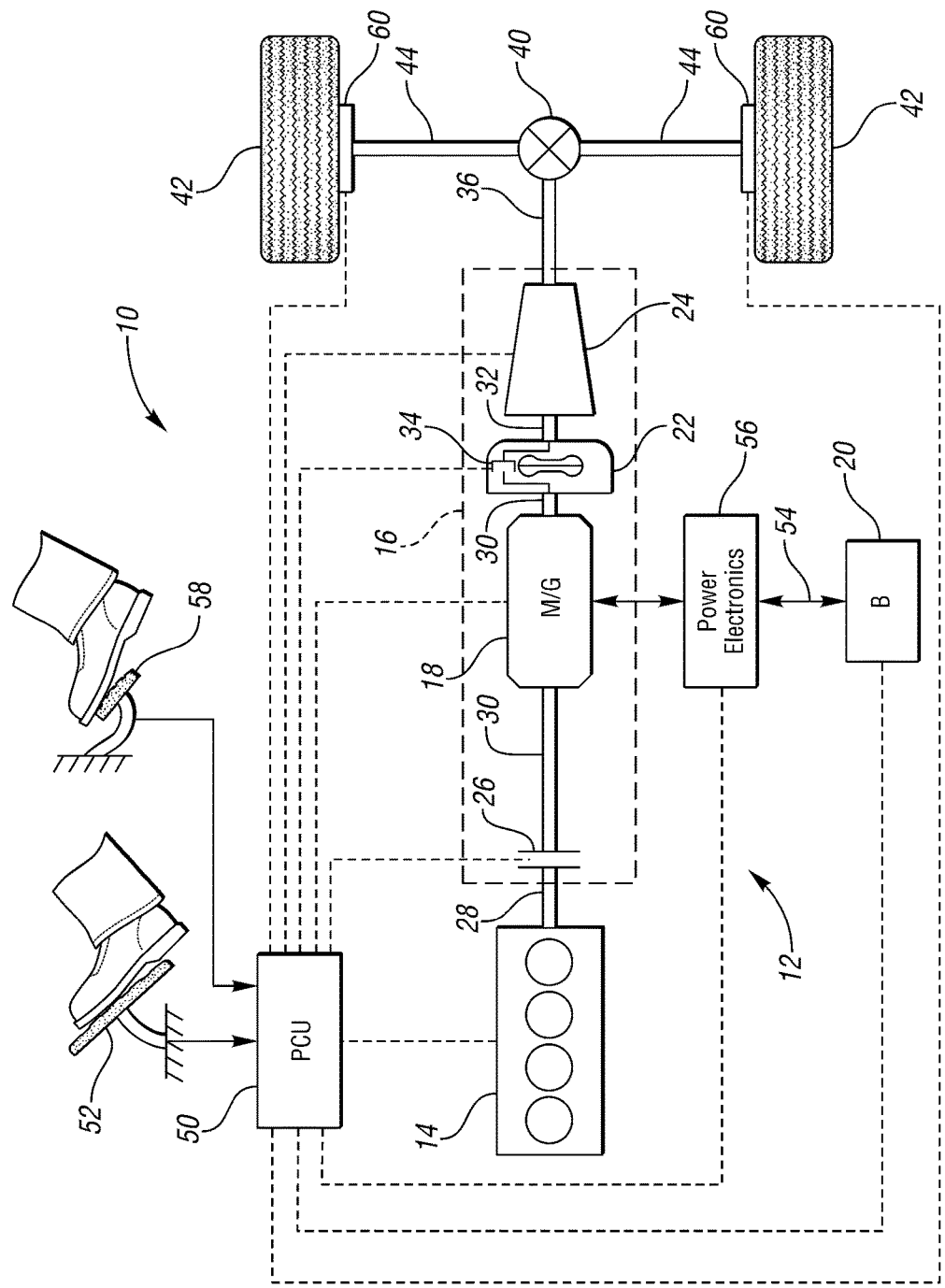
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

During regenerative braking, it may be advantageous for the control system of the HEV 10 to coordinate the operation of the powertrain and braking systems to maximize fuel economy while also accounting for vehicle drivability. This may be accomplished by adapting the control systems to consider a wheel torque schedule, which may include anti-jerk control, during a regenerative braking event. Failing to consider the wheel torque schedule during regenerative braking may lead to torque holes during braking because the brake control is not aware of the actual status of the powertrain. This may also results in the transmission unnecessarily capacitizing the torque converter to handle more negative torques when the powertrain has not actually requested so, causing waste of energy.

Figure 2:
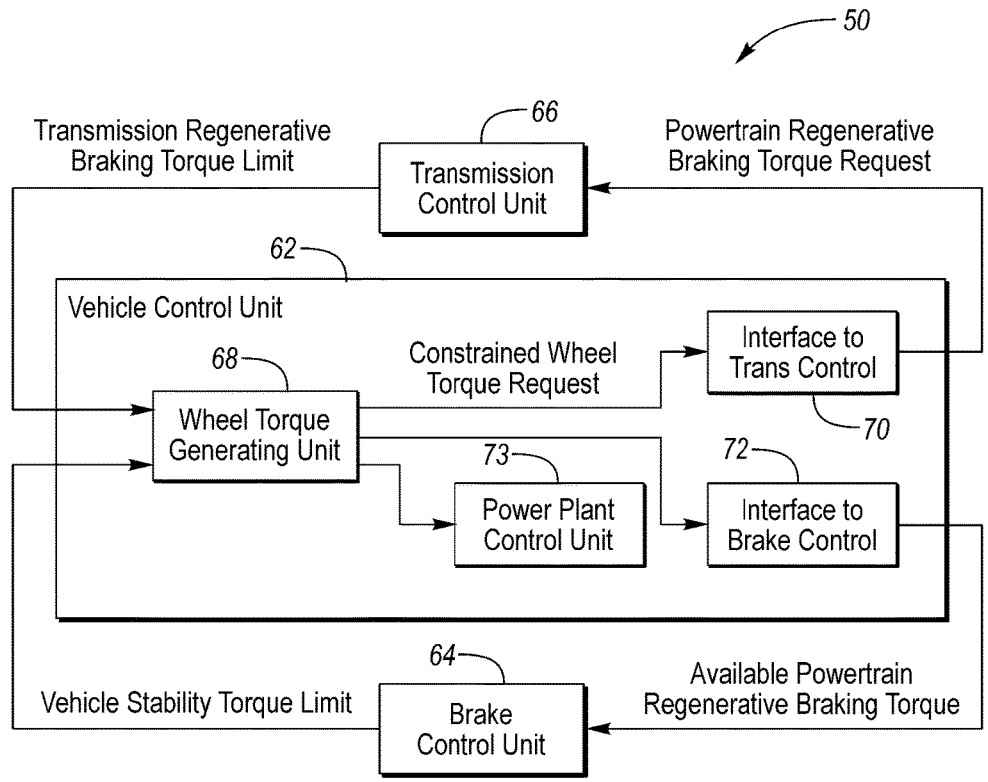
FIG. 2 is flowchart illustrating a vehicle powertrain controller.

Referring to FIG. 2, the controller (which may also be referred to as the powertrain control unit or powertrain contoller) 50 is illustrated. Various functions of the controller 50 may be implemented via algorithms and/or control logic that are stored within the memory of the controller 50. The controller 50 includes a vehicle control unit 62 that is configured to generate a torque request to the wheels 42. The vehicle control unit 62 communicates with a brake control unit 64 and a transmission control unit 66. The transmission control unit 66 may refer to portion of the controller 50 that is used to control the transmission gearbox 24, the torque converter 22, and/or the torque converter bypass clutch 34.

The brake control unit 64 may refer to the portion of the controller 50 that is used to control either the friction brakes 60 or the M/G 18 during regenerative braking. The controller 50 may include a series of input channels and output channels to communicate with and control various components of the HEV 10. Signals indicative of various states of the vehicle may be received by the controller 50 via the input channels and signals indicative of commands may be sent from the controller 50 to various components of the HEV 10. The controller 50 may also include internal input and output channels such that the various components (described in further detail below) that comprise the controller 50 may communicate with each other.

The vehicle control unit 62 includes a wheel torque generating unit (or powertrain output torque generating unit) 68 that generates a constrained wheel torque command or request (or constrained powertrain output torque command or request). The wheel torque generating unit 68 transmits a signal indicative of the constrained wheel torque request to an interface 70 from the vehicle control unit 62 to the transmission control unit 66. The constrained wheel torque request transmitted to the interface 70 may or may not the transmission regenerative braking torque limits. The interface 70 generates a powertrain braking torque request. The interface 70 then transmits a signal indicative of the powertrain braking torque request to the transmission control unit 66. The transmission control unit 66 in turn transmits a feedback signal indicative of a transmission regenerative braking torque limit to the wheel torque generating unit 68. The transmission regenerative braking torque limit may refer to the torque capacity of the transmission gearbox 24, the torque converter 22, and the torque converter bypass clutch 34 depending on the current operating mode (e.g., is the bypass clutch 34 currently open, slipping, or locked), the current gear selection in the gearbox 24, and/or the stress/strain limits of the physical components within the transmission gearbox 24, the torque converter 22, and the torque converter bypass clutch 34 during a regenerative braking event.

The wheel torque generating unit 68 also transmits a signal indicative of the constrained wheel torque request to an interface 72 from the vehicle control unit 62 to the brake control unit 64. The constrained wheel torque request transmitted to the interface 72 may or may not include vehicle stability torque limits. The interface 72 generates an available powertrain regenerative braking torque (or powertrain regenerative braking torque limit). The interface 72 then transmits a signal indicative of the available powertrain regenerative braking torque to the brake control unit 64. The brake control unit 64 in turn transmits a signal indicative of a vehicle stability torque limit to the wheel torque generating unit 68. The vehicle stability torque limit may refer to a maximum regenerative braking torque that can be applied on the wheels without causing a vehicle yaw instability event.

The signal indicative of the constrained wheel torque may also be transmitted from the wheel torque generating unit 68 to a power plant control unit 73. The power plant control unit 73 delivers torque commands to the engine 14 and the M/G 18. The torque commands to the engine 14 and the M/G 18 that may be based on the constrained wheel torque request.

Figure 3:
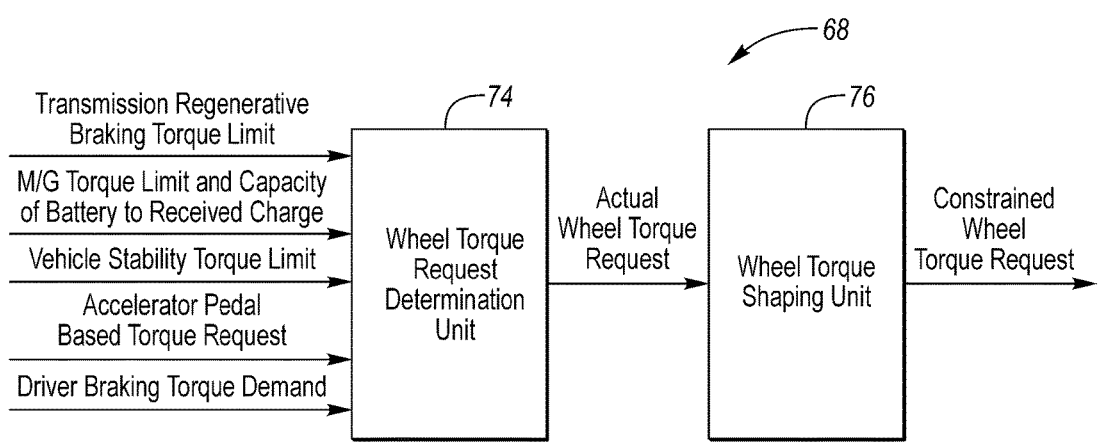
FIG. 3 is a flowchart illustrating a wheel torque generating unit of the powertrain controller.

Referring to FIG. 3, the wheel torque generating unit 68 of the controller 50 is illustrated. The wheel torque generating unit 68 includes a wheel torque request determination unit (or powertrain output torque request determination unit) 74 and a wheel torque shaping unit (or powertrain output torque shaping unit) 76. The wheel torque request determination unit 74 includes control logic and/or algorithms that are used to determine an actual wheel torque command or request (or actual powertrain output torque command or request) based on inputs including the transmission regenerative braking torque limit, the vehicle stability torque, a charging limit of the battery 20, a torque limit of the M/G 18, a torque request based on the position of the accelerator pedal 52, and a braking torque request based on the position of the brake pedal 58 that is not modified, altered, or filtered or constrained to either increase efficiency or improve drivability of the HEV 10. Once the actual wheel torque request is determined, the wheel torque request determination unit 74 transmits a signal indicative of the actual wheel torque request to the wheel torque shaping unit 76. The wheel torque shaping unit 76 includes control logic and/or algorithms that are used to generate the constrained wheel torque request. The constrained wheel torque request is a modified, altered, or filtered torque request based the actual wheel or actual powertrain output torque request from the vehicle user. For example, the constrained wheel torque request may produce a wheel torque that deviates from an actual wheel torque request of the vehicle user to either increase efficiency or improve drivability of the HEV 10. The constrained wheel torque request may be based on a wheel or powertrain torque schedule, such as an anti-jerk torque schedule, to prevent any NVH issues from occurring within the vehicle powertrain or other components of the drivetrain at the time of changing gears, performing a tip-in/out, braking, etc. Other components of the drivetrain may include the torque converter 22, gearbox 24, output shaft 36, differential 40, and axles 44.

Figure 4:
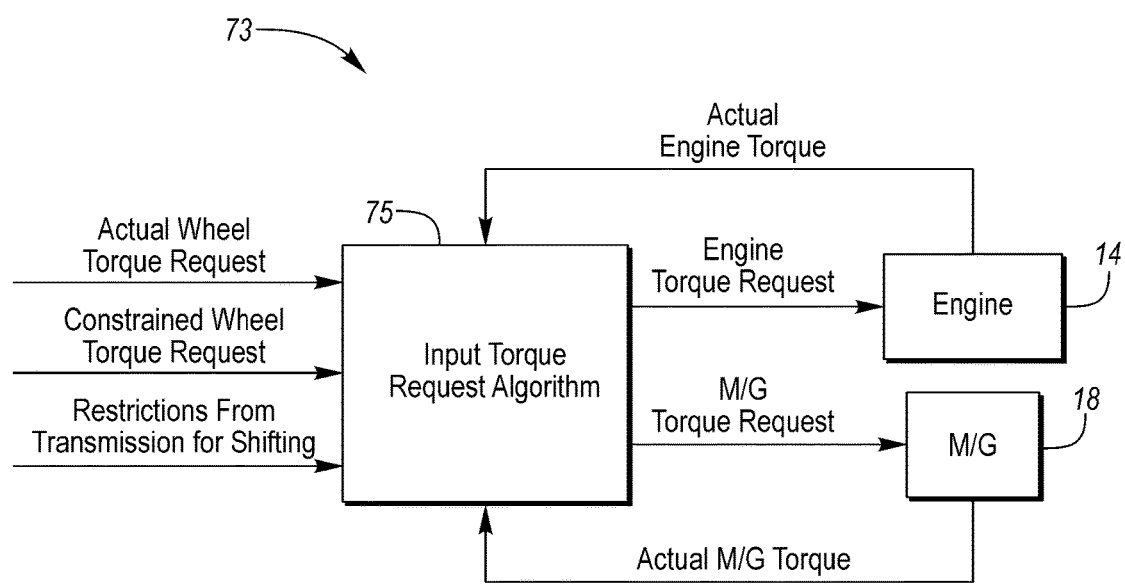
FIG. 4 is a flowchart illustrating a power plant control unit of the powertrain controller.

Referring to FIG. 4, the power plant control unit 73 of the powertrain controller 50 is illustrated. The power plant control unit 73 includes an input torque request algorithm 75 that determines an engine torque command or request that is sent to the engine 14 and a M/G torque command or request that is sent to the M/G 18. The torque requests to the both the engine 14 and the M/G 18 may refer to the amount of respective torques delivered to the input of the transmission 16 (i.e., the torque to the torque converter 22 via the shaft 30) via the engine 14 and the M/G 18. The input torque request algorithm 75 may base the engine torque request and the M/G torque request on either the constrained wheel torque request or the actual wheel torque request, each depicted in FIG. 3. Under scenarios where the wheel torque is limited by some constraint (such as an anti-jerk constraint during a lash crossing of the powertrain, discussed in further detail below), the constrained wheel torque may be used to determine the engine torque request and the M/G torque request. Under scenarios where the wheel torque is not limited by some constraint, the actual wheel torque request may be used to determine the engine torque request and the M/G torque request. The input torque algorithm 75 may also be restricted by the transmission during transmission shifts that result in speed adjustments at the input of the transmission 16 (i.e., the torque to the torque converter 22 via the shaft 30), which may require speed and/or torque adjustments of the engine 14 and/or M/G 18. Feedback loops from the engine 14 and the M/G 18, respectively, may communicate actual or measured engine torque and actual or measured M/G torque back to the input torque request algorithm 75. The input torque request algorithm 75 may include a first feedback controller that adjusts the engine torque based on the difference between the actual engine torque and the engine torque request. The input torque request algorithm 75 may include a second feedback controller that adjusts the motor torque based on the difference between the actual M/G torque and the M/G torque request.

The first and second feedback loops may include a proportional term, integral term, derivative term, or any combination thereof.

Figure 5:
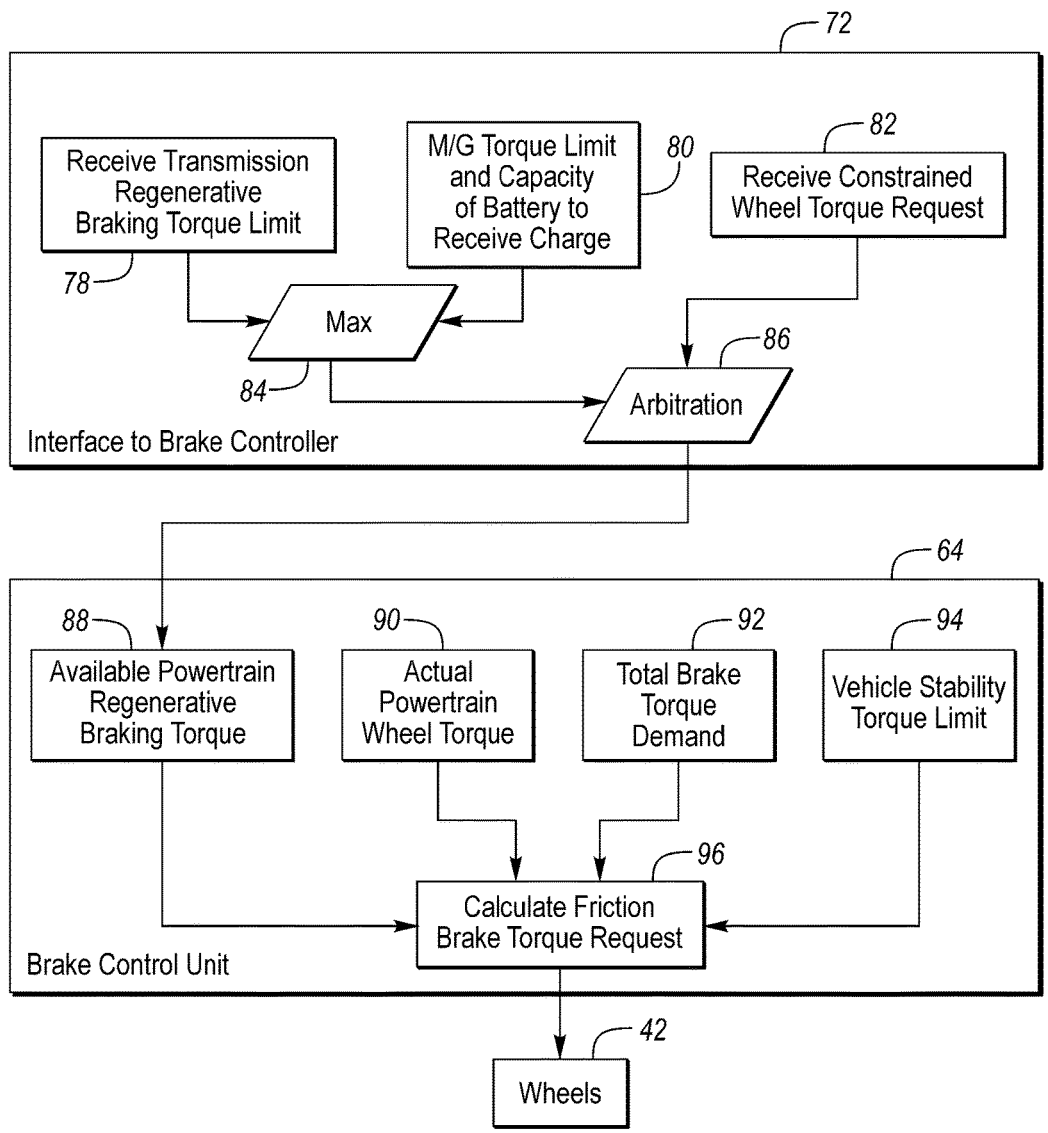
FIG. 5 is a flowchart illustrating an interface between a vehicle control unit of the powertrain controller and a brake control unit of the powertrain controller.

Referring FIG. 5, the interface 72 between the vehicle control unit 62 and the brake control unit 64 of the controller 50 is illustrated. FIG. 5 also illustrates the how the brake control unit 64 calculates a friction brake torque request during a regenerative braking event. The interface 72 and brake control unit 64 include control logic and/or algorithms that perform the various functions of the interface 72 and brake control unit 62 that are described below.

The interface 72 includes a first input block 78, a second input block 80, a third input block 82, a maximum block 84, and an arbitration block 86. The first input block 78 transmits a signal indicative of the transmission regenerative braking torque limit (which is generated by the transmission control unit 66) to the maximum block. The second input block 80 transmits a signal indicative of the torque limit of the M/G 18 (which may be limited by the capacity of the battery 20 receive charge) to the maximum block 84. The maximum block 84 determines the maximum of the transmission regenerative braking torque limit and the torque limit of the M/G 18 (taking into account the charge limit of the battery 20). Next, the maximum block 84 transmits a signal indicative of the maximum of transmission regenerative braking torque limit and torque limit of the M/G 18 (taking into account the charge limit of the battery 20) to the arbitration block 86. The third input block 82 transmits a signal indicative of the constrained wheel torque request (which is generated by the wheel torque generating unit 68) to the arbitration block 86. The arbitration block 86 then transmits a signal indicative of the available powertrain regenerative braking torque to the brake control unit 64.

The brake control unit 64 includes a first input block 88, a second input block 90, a third input block 92, a fourth input block 94, and a friction brake torque request calculation block 96. The first input block 88 transmits a signal indicative of the available powertrain regenerative braking torque to the friction brake torque request calculation block 96. The available powertrain regenerative braking is received by the first input block from the arbitration block 86 of the interface 72 between the vehicle control unit 62 and the brake control unit 64. The second input block 90 transmits a signal indicative of the actual powertrain wheel torque (or actual powertrain output torque) to the friction brake torque request calculation block 96. The actual powertrain real torque may be received from the vehicle control unit 62 or maybe transmitted from a sensor that is configured to detect the torque at the wheels 42 (or the output of the powertrain). The third input block 92 transmits a signal indicative of a total brake torque demand to the to the friction brake torque request calculation block 96. The total brake torque demand may be based on a position of the brake pedal 58 caused by a user is depressing the brake pedal 58. The fourth input block 94 transmits a signal indicative of the vehicle stability torque limit to the to the friction brake torque request calculation block 96. The vehicle stability torque limit may refer to a maximum regenerative braking torque that can be applied on the wheels without causing a vehicle yaw instability event. The information input into the friction brake torque request calculation block 96 is transformed into a friction brake torque request based on control logic and/or algorithms that are included within the friction brake torque request calculation block 96. The friction brake torque request calculation block 96 then transmits a signal indicative of the friction brake torque request to the wheels 42.

Figure 6:
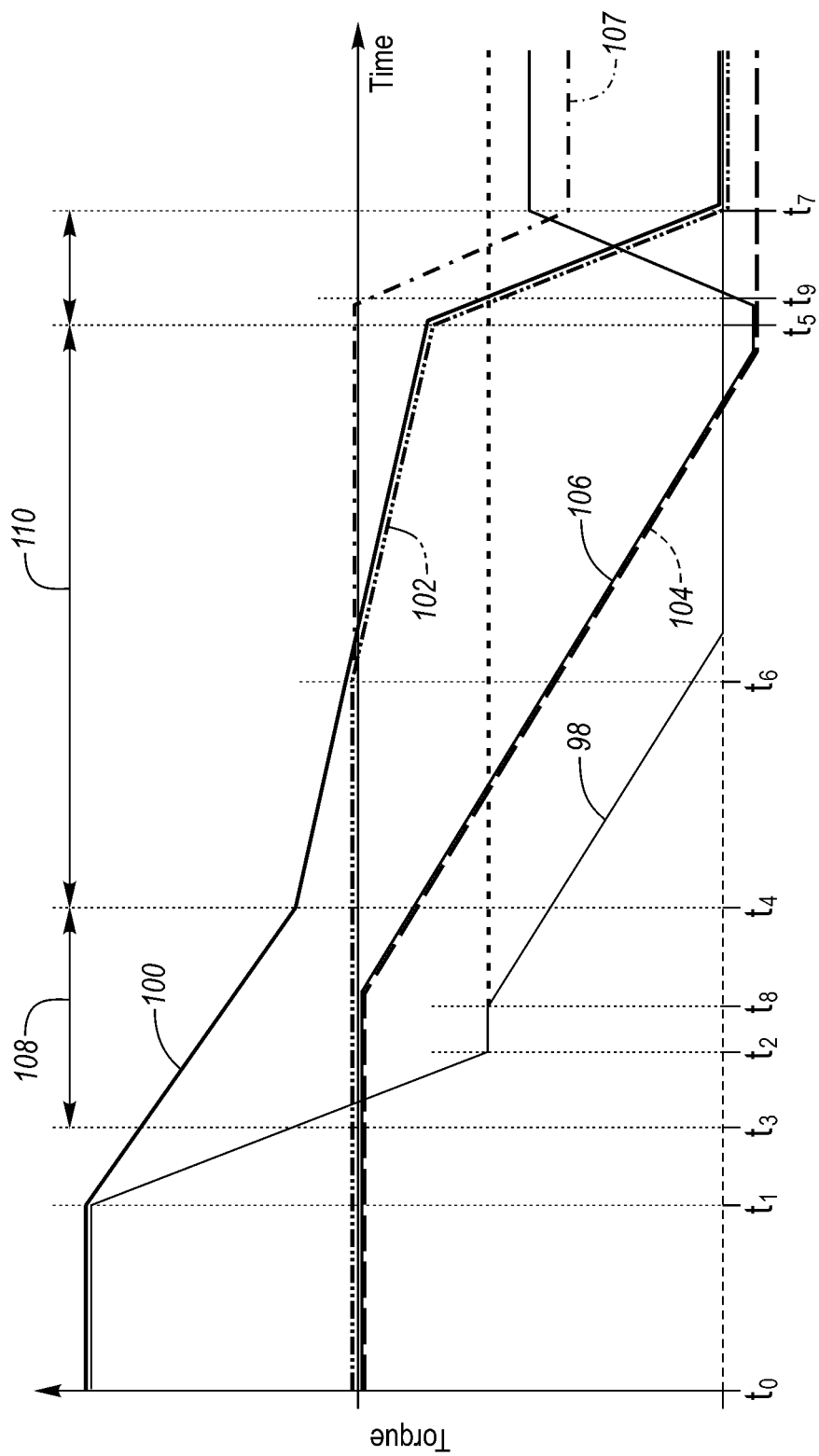
FIG. 6 is an exemplary graph illustrating the relationships between wheel torque, regenerative braking torque, and friction braking torque.

Referring to FIG. 6, an exemplary graph representing the relationships between wheel torque, regenerative braking torque, and friction braking torque is illustrated. The relationships represented in the graph are based on the functionality of the controller 50 including the functionality of, but not limited, the interface 72 and the brake control unit 64. A first plot on the graph represents an unfiltered demanded wheel torque (or unfiltered demanded powertrain output torque) 98 plotted against time. The unfiltered demanded wheel torque may correspond to the actual wheel torque request depicted if FIG. 3. The unfiltered demanded wheel torque 98 may be based on the torque commands received from the user of the HEV 10 via the accelerator pedal 52 and/or brake pedal 58. A second plot on the graph represents a filtered demanded wheel torque (or filtered demanded powertrain output torque) 100 plotted against time. The filtered demanded wheel torque may correspond to the constrained wheel torque request depicted in FIGS. 2 and 3. The unfiltered demanded wheel torque 98 may be filtered according to a wheel torque schedule to coordinate the operation of the powertrain and braking systems to maximize fuel economy or improve vehicle drivability. For example, the filtered demanded wheel torque 100 may follow a torque schedule that slowly decreases the wheel (or powertrain output) torque when there is a sudden change from a demanded wheel torque having a positive value to a negative value in order to prevent NVH issues from occurring within the powertrain or other components of the drivetrain. Negative values of wheel torque may refer to a decelerating or braking event of the HEV 10 while positive values of wheel torque may refer to an acceleration event of the HEV 10. The described example of the filtered demanded wheel torque 100 may be referred to as an anti-jerk torque control system or an anti-jerk torque schedule. A third plot on the graph represents the available powertrain regenerative braking torque (or powertrain regenerative braking torque limit) 102 plotted against time, which is also represented by the first input block 88 of the brake control unit 64 in FIG. 5. A fourth plot on the graph represents total brake torque demand 104 plotted against time, which is also represented by the third input block 92 brake control unit 64 in FIG. 5. A fifth plot on the graph represents the friction brake torque request 106 plotted against time, which is generated at the friction brake torque request calculation block 96 in FIG. 5.

When a vehicle user releases the accelerator pedal 52, which is represented as the event occurring at time $t_1$, the unfiltered demanded wheel torque 98 may quickly dropped to a demanded negative wheel torque value at time $t_2$. The negative wheel torque value at time $t_2$ represents the wheel torque value when the accelerator pedal 52 is completely released (which may be referred to as the lift pedal torque request) prior to receiving a braking torque request. The filtered demanded wheel torque request 100, however, will prevent the actual wheel torque from dropping as quickly as the unfiltered demanded wheel torque 98 to prevent NVH issues in order to improve the drivability of the HEV 10. The actual wheel torque may be approximately equal to the filtered demanded wheel torque request 100.

Shortly after the user releases the accelerator pedal 52, between times $t_3$ and $t_4$, the filtered demanded wheel torque 100 will experience a period of time where torque is decreased (or ramped down) to simulate a damping torque that occurs from a controlled throttle closing, which may including damping resulting from engine compression. This period of time may be referred to as a damping (or dashpot) period 108. Once the damping period ends at time $t_4$, the filtered demanded wheel torque request 100 continues to decrease during a period of lash crossing 110. Lash crossing refers to a period of time where there is a change in direction in the torque being transferred through the powertrain and drivetrain. The rate at which the filtered demanded wheel torque 100 decreases during the period of lash crossing 110 is less than the rate at which the filtered demanded wheel torque 100 decreases during the damping period 108. The period of lash crossing 110 occurs between times $t_4$ and $t_5$. The period of lash crossing 110 may be divided into two periods, the first corresponding to positive filtered demanded wheel torque request values while the other corresponds to negative filtered demanded wheel torque request values. The portion of the period of lash crossing 110 where the filtered demanded wheel torque request 100 has positive values occurs between times $t_4$ and $t_6$. The portion of the period of lash crossing 110 where the filtered demanded wheel torque request 100 has negative values occurs between times $t_6$ and $t_5$. Once the period of lash crossing 110 is completed at time $t_5$, the rate at which the filtered demanded wheel torque request 100 decreases is increased until the filtered demanded wheel torque request 100 is ramped to the torque value of the unfiltered demanded wheel torque 98 at time $t_7$. At time $t_7$, the filtered demanded wheel torque request 100 merges with the unfiltered demanded wheel torque 98 resulting in a single unfiltered demanded wheel torque.

When a vehicle user depresses the brake pedal 58 (which is demonstrated as occurring beginning at time $t_8$), the controller 50 will need to determine if it is possible to utilize the braking energy for some purpose or recapture the braking energy to charge the battery 20 with the M/G 18 via regenerative braking. First, the available powertrain regenerative braking torque 102 is determined based on the control logic and/or algorithms of the interface 72 from the vehicle control unit 62 to the brake control unit 64. As previously stated, the available powertrain regenerative braking torque 102 is based on the output of the arbitration block 86 in FIG. 5, which is an arbitration between the constrained wheel torque request and the maximum of the transmission regenerative braking torque limit and the torque limit of the M/G 18 (taking into account the charge limit of the battery 20). Again, the maximum of the transmission regenerative braking torque limit and the torque limit of the M/G 18 (taking into account the charge limit of the battery 20) is determined in the maximum block 84. For simplicity purposes, the output of the maximum block 84 will be referred to as the powertrain maximum regenerative braking torque. The process occurring within the arbitration block 86 will limit the available powertrain regenerative braking torque 102 to the torque schedule of the filtered demanded wheel torque 100, during a period decreasing demanded wheel torque until the filtered demanded wheel torque 100 merges with the unfiltered demanded wheel torque 98 at time $t_7$. During a first period from time $t_8$ to time $t_6$, when the filtered demanded wheel torque 100 is positive after the vehicle user depresses the brake pedal 58, the available powertrain regenerative braking torque 102 will be limited to zero. The first period, from time $t_0$ to time $t_6$, includes the damping period 108 and a first portion of the period of lash crossing 110, between times $t_4$ and $t_6$, corresponding to the portion of the period of lash crossing 110 where the filtered demanded wheel torque 100 is positive. Once the filtered demanded wheel torque 100 becomes negative during the period of lash crossing 110 at time $t_6$, the available powertrain regenerative braking torque 102 will be equal to the filtered demanded wheel torque 100 during a second period. The second period corresponds to a time period between $t_6$ (the filtered demanded wheel torque 100 becoming negative during the period of lash crossing 110) and $t_5$ (the completion of the period of lash crossing 110). Once the period of lash crossing is complete at time $t_5$, the available powertrain regenerative braking torque 102 is no longer limited by the wheel torque schedule of the filtered demanded wheel torque 100 and is be ramped to obtain the powertrain maximum regenerative braking torque at time $t_7$.

Also, when the vehicle user is depresses the brake pedal 58 at time $t_8$, the total brake torque demand 104 will be filled by the friction brake torque request 106 until the available powertrain regenerative braking torque 102 drops below the lift pedal torque request at time $t_9$. Once the available powertrain regenerative braking torque 102 drops below the negative value of the lift pedal torque request at time $t_9$, an actual regenerative braking torque (which is limited to available powertrain regenerative braking torque 102) will be requested and commanded (based on the total brake torque demand 104, and a need, demand, or request to recapture braking energy to charge the battery 20 or a need to utilize braking energy for some other purpose). The negative value of the friction brake torque request 106 will decrease by the amount of delivered actual regenerative braking torque. The actual regenerative braking torque will be limited by the constraints such as the transmission regenerative braking torque limit and the torque limit of the M/G 18 (which may be limited by the capacity of the battery 20 receive charge). In the shown example, the actual regenerative braking torque is represented by the line 107 and is the difference between the total brake torque demand 104 and the friction brake torque request 106. In the shown example, the actual regenerative braking torque 107 would not satisfy the brake torque request 106, during a period of an increasing brake torque request 106, even if the M/G 18 were available and the battery state of charge was such that regenerative braking alone could satisfy the braking request, since the actual regenerative braking torque 107 is limited to the available powertrain regenerative braking torque 102. Between the time period $t_9$ and $t_7$, the negative value of the friction braking torque request 106 is decreased as the actual regenerative braking torque is increased. In the example depicted in FIG. 6, the negative friction braking torque request 106 and the actual regenerative braking torque are ramped to steady values at time $t_7$, however, it should be understood that the negative friction braking torque request 106 and the actual regenerative braking torque may be ramped to non-steady state values and may change as a demand for braking and the system constraints change. Furthermore, it should be understood however that the actual regenerative braking 107 could have a value anywhere between zero and the available powertrain regenerative braking torque 102, after the available regenerative braking torque 102 obtains a negative value, based on the need to utilize braking energy or recapture braking energy to charge the battery 20. Accordingly, if the actual regenerative braking torque does have a different value than shown, the friction brake torque request 106 would be adjusted accordingly such that the actual regenerative braking torque and the friction brake toque request 106 would achieve the total brake torque demand 104. Furthermore, it should be understood that the negative value of the lift pedal torque request could be dynamic and different from the value shown in FIG. 6 and the time at which a brake demand starts ($t_8$) could be adjusted to occur at a different time that shown. If the lift pedal torque request is different or the time of the brake demand is shifted, the friction brake torque request 106 and the actual regenerative braking will be adjusted accordingly based on the description above.

Figure 7:
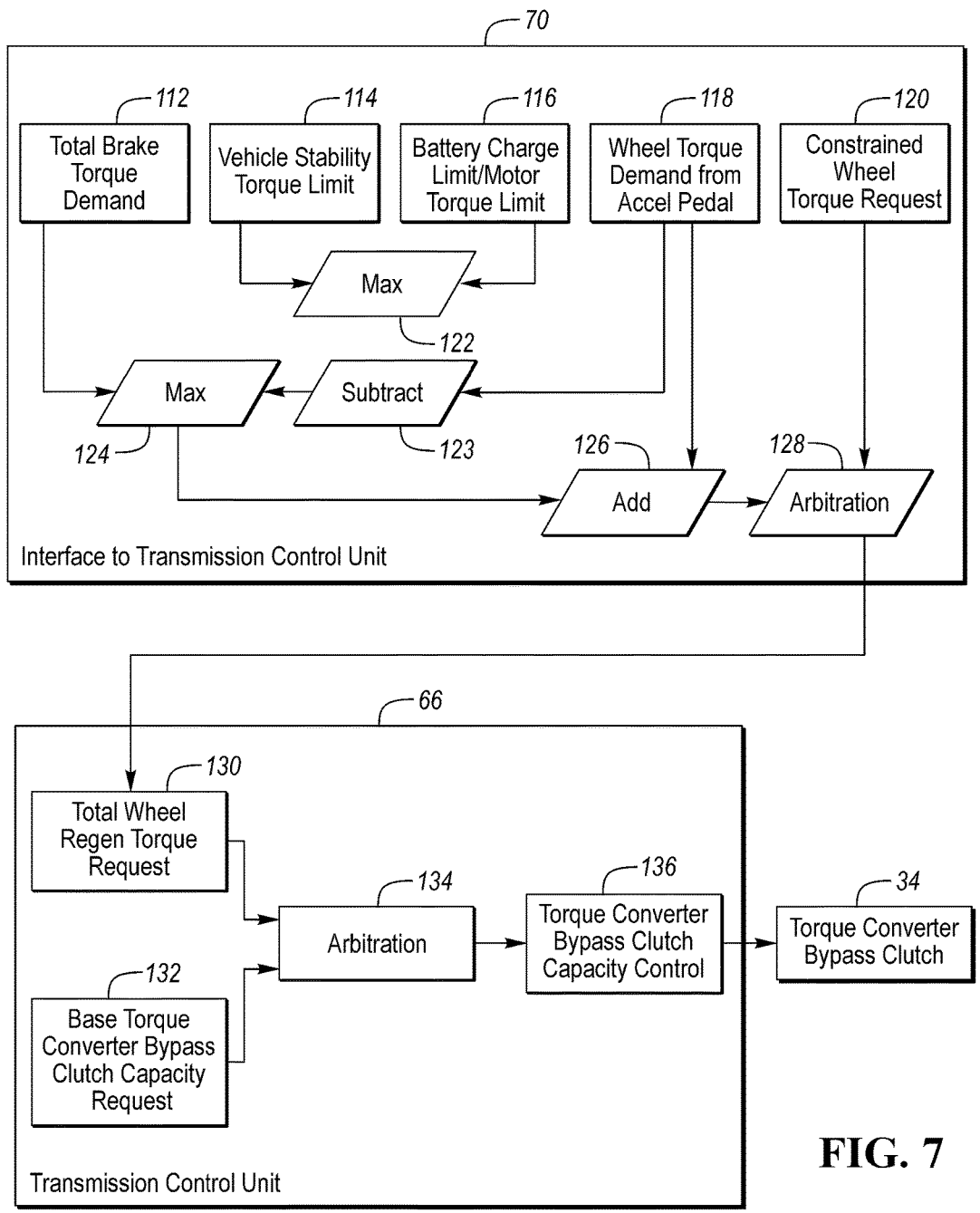
FIG. 7 is a flowchart illustrating an interface between the vehicle control unit of the powertrain controller and a transmission control unit of the powertrain controller.

Referring to FIG. 7, the interface 70 between the vehicle control unit 62 and the transmission control unit 66 of the controller 50 is illustrated. FIG. 7 also illustrates the how the transmission control unit 66 capacitizes the torque converter bypass clutch 34 during a regenerative braking event. Capacitizing a clutch may refer to adjusting the capacity of a clutch to transfer torque from an input side to an output side of the clutch when the clutch is in a closed-state. The bypass clutch 34 will be in an open state when the input and output sides of the bypass clutch 34 are not in contact with each other. The bypass clutch 34 will be in a closed-state when the input and output sides of the bypass clutch are in contact with each other in either a locked or slipping condition. The capacity of the torque converter bypass clutch 34 may be increased by increasing the contact pressure between the input and outside side of the bypass clutch 34. The capacity of the torque converter bypass clutch 34 may be decreased by decreasing the contact pressure between the input and outside side of the torque converter bypass clutch 34. An actuator may be used to increase or decrease the pressure between the input and output sides of the torque converter bypass clutch 34. Actuators may include hydraulic pistons, pneumatic pistons, electrical solenoids, electric motors (e.g., servo motors), or any other actuator known in the art that is capable forcing opposing sides of clutch into and out of engagement with each other. The interface 70 and transmission control unit 66 include control logic and/or algorithms that perform the various functions of the interface 70 and transmission control unit 66 that are described below.

The interface 70 includes a first input block 112, a second input block 114, a third input block 116, a fourth input block 118, a fifth input block 120, a first maximum block 122, a subtraction block 123, a second maximum block 124, an addition block 126, and an arbitration block 128. The first input block 112 transmits a signal indicative of the total brake torque demand to the second maximum block 124. The second input block 114 transmits a signal indicative of the vehicle stability torque limit to the first maximum block 122 while the third input block 116 transmits a signal indicative of the torque limit of the M/G 18 (which may be limited by the capacity of the battery 20 receive charge) to the first maximum block 122. A signal indicative of the maximum of the vehicle stability torque limit and the torque limit of the M/G 18 (which may be limited by the capacity of the battery 20 receive charge) is then transmitted from the first maximum block 122 to the subtraction block 123 while the fourth input block 118 transmits a signal indicative of the wheel torque demand from accelerator pedal 52 to the subtraction block 123. A signal indicative of the difference between the maximum of the vehicle stability torque limit and the torque limit of the M/G (18 determined at block 122) and the wheel torque demand from accelerator pedal 52 (input from block 118) is then input from the subtraction block 123 into the second maximum block 124. A signal indicative of the maximum of the total brake torque demand and the output of subtraction block 123 is then transmitted from the second maximum block to the addition block 126. The fourth input block 118 transmits a signal indicative of the wheel torque demand from accelerator pedal 52 to the addition block 126. The addition block 126 then sends a signal indicative of the addition of the wheel torque demand from accelerator pedal 52 and the output of the second maximum block 124 to the arbitration block 128. The fifth input block 120 transmits a signal indicative of the constrained wheel torque request to the arbitration block 128. The arbitration block 128 then transmits a signal indicative of a total wheel regenerative braking request (or total powertrain output regenerative braking request) to the transmission control unit 66.

The transmission control unit 66 includes a first input block 130, a second input block 132, an arbitration block 134, and the torque converter bypass clutch capacity control block 136. The first input block 130 transmits a signal indicative of the total wheel regenerative braking torque request to the arbitration block 134. The total wheel regenerative braking torque request is received by the first input block 130 from the arbitration block 128 of the interface 70 between the vehicle control unit 62 and the transmission control unit 66. The second input block 132 transmits a signal indicative of a base torque converter bypass clutch capacity request to the arbitration block 134. The base torque converter bypass clutch capacity request may be based on a standard control that includes control logic and/or algorithms that capacitize torque converter bypass clutch 34 without considering a filtered or constrained demanded wheel torque (or filtered demanded powertrain output torque), such as an anti-jerk control. The arbitration block 134 then transmits a signal to the torque converter bypass clutch capacity control block 136 to control the torque converter bypass clutch 34 based on either the total wheel regenerative braking torque request from the first input block 130 or the base torque converter bypass clutch capacity request from the second input block 132. The torque converter bypass clutch capacity control block 136 then transmits a signal indicative of the desired torque capacity of the torque converter bypass clutch 34 to capacitize the torque converter bypass clutch 34.

Figure 8:
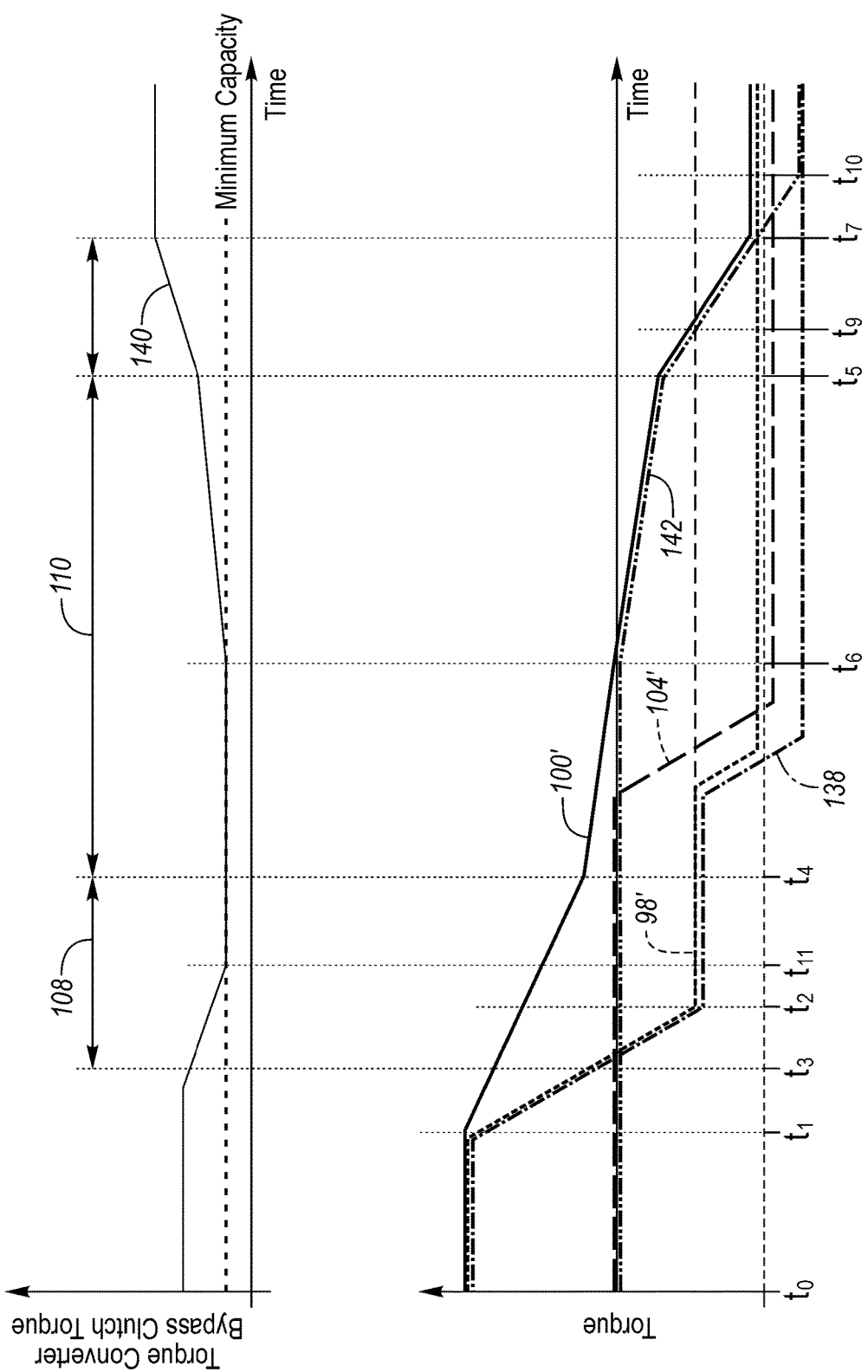
FIG. 8 is an exemplary graph illustrating the relationships between wheel torque, regenerative braking torque, and the torque capacity of a torque converter bypass clutch.

Referring to FIG. 8, an exemplary graph representing the relationships between wheel torque, regenerative braking torque, and the torque capacity of the torque converter bypass clutch 34 is illustrated. The relationships represented in the graph are based on the functionality of the controller 50, including the functionality of, but not limited to, the interface 70 from the vehicle control unit 62 to the transmission control unit 66 and the transmission control unit 66. A first plot on the graph represents an unfiltered demanded wheel torque (or unfiltered demanded powertrain output torque) 98' plotted against time, a second plot on the graph represents a filtered demanded wheel torque (or filtered demanded powertrain output torque) 100' plotted against time, and a third plot on the graph represents total brake torque demand 104' plotted against time. The unfiltered demanded wheel torque 98', filtered demanded wheel torque 100', and the total brake torque demand 104' in FIG. 8 will include the same limitations and characteristic as the unfiltered demanded wheel torque 98, filtered demanded wheel torque 100, and the total brake torque demand 104 described in FIG. 6, respectively, except for any differences described herein with respect to FIG. 8. Also, any the times labeled $t_1$ through $t_9$ that are included in FIG. 8, corresponds to the same occurrence or event that is associated with the respective time $t_1$ through $t_9$ shown in FIG. 6 unless otherwise described herein.

FIG. 8 also includes a plot on the graph representing a wheel torque request that ignores the transmission regenerative braking limit 138 plotted against time and a plot on the graph representing the total wheel regenerative braking torque request 142 plotted against time. The total wheel regenerative braking torque request 142 will be limited by the filtered demanded wheel torque 100' in the same manner as the available powertrain regenerative braking torque 102 is limited by the filtered demanded wheel torque 100 in FIG. 6, except that the total wheel regenerative braking torque request 142 may decrease to a negative value of the wheel torque request that ignores the transmission regenerative braking limit 138 at time $t_{10}$. The total wheel regenerative braking torque request 142 will decrease to the wheel torque request that ignores the transmission regenerative braking limit 138 so that the torque converter bypass clutch 34 may be properly capacitized to the regenerative braking torque demand (with an appropriate margin above a theoretical value to ensure no slippage actually occurs) based on the torque limits of the M/G 18 (taking into account the charge limit of the battery 20) without being affected by the transmission regenerative braking torque limit.

FIG. 8 also includes a plot on the graph that represents the torque capacity of the bypass clutch 140 plotted against time. The torque capacity the bypass clutch 140 is plotted in FIG. 8 to demonstrate how the torque converter bypass clutch 34 may be capacitized during a regenerative braking event based on the functionality of the controller 50 including the functionality of, but not limited, the interface 70 from the vehicle control unit 62 to the transmission control unit 66 and the transmission control unit 66.

When a vehicle user releases the accelerator pedal 52 at time $t_1$, the torque capacity of the bypass clutch 140 may begin to decrease, immediately or shortly thereafter, until it obtains a minimum closed-state value at time $t_{11}$. The torque capacity of the torque converter bypass clutch 34 may be reduced at a constant rate to the minimum closed-state value in response to a detected decreasing value of the unfiltered demanded wheel torque 98', in response to the unfiltered demanded wheel torque 98' approaching or obtaining a zero value, or in response to the unfiltered demanded wheel torque 98' obtaining a negative value while the filtered demanded wheel torque 100' remains positive. From time $t_{11}$ and until the filtered demanded wheel torque 100' obtains a negative value at time $t_6$, the torque capacity of the bypass clutch 140 remains at the minimum closed-state value, unless the torque demand changes by some event (such as the user re-applying the accelerator pedal 52). During the period of time between $t_1$ to $t_6$, the arbitration block 134 will direct the bypass clutch capacity control block 136 to control the torque converter bypass clutch 34 based on the base torque converter bypass clutch capacity request, represented by the second input block 132 (and not the total wheel regenerative braking torque request 130), since the filtered demanded wheel torque 100' remains positive and the total wheel regenerative braking torque request 142 is zero. Also, during the time period between $t_1$ to $t_6$, the torque capacity of the converter bypass clutch is reduced to the minimum closed-state value since the unfiltered demanded wheel torque 98' is reduced to a negative value while total wheel regenerative braking torque request 142 is zero.

During the period of time after $t_6$ when the filtered demanded wheel torque 100' and total wheel regenerative braking torque request 142 become negative, the arbitration block 134 will direct the bypass clutch capacity control block 136 control the torque capacity of the torque converter bypass clutch 34 based on the total wheel regenerative braking torque request 142, also represented by the first input block 130. The plot representing the torque capacity of the bypass clutch 140 is increased after time $t_6$. The torque capacity of the bypass clutch 140 may increase as the negative value of the total wheel regenerative braking torque request 142 increases or decrease as the negative value of the total wheel regenerative braking torque request 142 decreases.

For illustrative purposes, the negative value of the total wheel regenerative braking torque request 142 increases in FIG. 8 at the same rate that the negative value of the filtered demanded wheel torque 100' increases between times $t_6$ and $t_7$ to demonstrate how the torque converter bypass clutch 34 is capacitized during regenerative braking. However, the total wheel regenerative braking torque request 142 after time $t_6$ could be ramped at a different rate from and have a different value than the filtered demanded wheel torque 100'. Therefore, it should be understood that the increase in the capacity of the bypass clutch 34 after time $t_6$ could be different from what is demonstrated in FIG. 8. More specifically, the total wheel regenerative braking torque request 142 between times $t_6$ and $t_7$ could have any value between zero and the filtered demanded wheel torque 100'. After time $t_7$, the total wheel regenerative braking torque request 142 could have any value between zero and unfiltered demanded wheel torque 98'. For torque converter bypass clutch 34 capacitizing purposes only, at time $t_7$ the total regenerative braking torque request 142 may appear to be ramped to the wheel torque request that ignores the transmission regenerative braking limit 138 at time $t_{10}$. It should be noted, however that real word regenerative braking may not have a greater negative value than either the filtered demanded wheel torque 100' or the unfiltered demanded wheel torque 98', depending on which is currently controlling the regen limit, similar to how the available powertrain regenerative braking torque 102 may not have a greater negative value than either the filtered demanded wheel torque 100 or the unfiltered demanded wheel torque 98, described in FIG. 6 above.

As described above, the total wheel regenerative braking torque request 142 will be a function of the unfiltered demanded wheel torque 98' or the filtered demanded wheel torque 100' depending on current conditions of the vehicle powertrain. The capacity of the torque converter bypass clutch 34 in turn is a function of the total wheel regenerative braking torque request 142 and may ignore the transmission regenerative braking limit when the total wheel regenerative braking torque request 142 is based on the unfiltered demanded wheel torque 98'. More, specifically, the negative value of the total regenerative braking request 142 may increase as negative values of the unfiltered demanded wheel torque 98' or the filtered demanded wheel torque 100' increase, depending on which is controlling the regenerative braking request 142 based on current conditions of the vehicle powertrain. The capacity of the torque converter bypass clutch 34 in turn may increase as the negative values of the total regenerative braking request 142 increases. Therefore, the capacity of the torque converter bypass clutch 34 may increase as negative values of the unfiltered demanded wheel torque 98' or the filtered demanded wheel torque 100' increase, depending on which is controlling the regenerative braking request 142 based on current conditions of the vehicle powertrain.

Furthermore, the capacity of the torque converter bypass clutch 34 may increase proportionally to a negative increase in the value of the total regenerative braking request 142, the unfiltered demanded wheel torque 98', the filtered demanded wheel torque 100', or the wheel torque request that ignores the transmission regenerative braking limit 138, depending on which of unfiltered demanded wheel torque 98' or the filtered demanded wheel torque 100' is currently controlling the regenerative braking request 142. For example, during a second portion of the period of lash crossing 110, between times $t_6$ and $t_5$ and following the period between $t_{11}$ and $t_6$ where the torque capacity of the torque converter bypass clutch 34 is at minimum closed-state value, the torque capacity of the torque converter bypass clutch 34 may be increased at a first rate that is in proportion to the rate of increase in the negative value of the total regenerative braking request 142 and/or the rate of increase in the negative value of the filtered demanded wheel torque 100'. Furthermore, after the period of lash crossing, the torque capacity of the torque converter bypass clutch 34 may be increased at a second rate that is in proportion to a second rate of increase in the negative value of the total regenerative braking request 142 and/or the rate of increase in the negative value of the filtered demanded wheel torque 100'. The rate of increase in the torque capacity of the torque converter bypass clutch 34 during the period between times $t_{11}$ and $t_6$ may be greater than rate of increase of the torque capacity of the torque converter bypass clutch 34 during the second portion of the period of lash crossing 110, between times $t_6$ and $t_5$. The rate of increase in the negative value of the total regenerative braking request 142 and/or the rate of increase in the negative value of the filtered demanded wheel torque 100' during the period between times $t_{11}$ and $t_6$ may be greater than the rate of increase in the negative value of the total regenerative braking request 142 and/or the rate of increase in the negative value of the filtered demanded wheel torque 100' during the second portion of the period of lash crossing 110, between times $t_6$ and $t_5$.

Controlling the capacity of the torque converter bypass clutch 34, based on the base torque converter bypass clutch capacity request 132, before the filtered demanded wheel torque 100' achieves a negative value, prevents wasting energy which may occur when the torque converter bypass clutch 34 is capacitized for regenerative braking prior to there being wheel torque that is less than zero (which is required before regenerative braking may occur). Furthermore, controlling the capacity of the torque converter bypass clutch 34 based on the filtered demanded wheel torque 100' as opposed to controlling the capacity of the torque converter bypass clutch 34 based on the unfiltered demanded wheel torque 98', when the filtered demanded wheel torque 100' has a smaller negative value than the unfiltered demanded wheel torque 98', prevents wasting energy by capacitizing the torque converter bypass clutch to the actual regenerative braking needs. Also, controlling torque converter bypass clutch 34 based on the total wheel regen torque request 130 allows the capacity to increase ahead of the applied M/G 18 or Engine 14 to the input of the torque converter 30 ensuring timely regen capture (since the M/G 18 can respond very fast compared to an engine).

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle system comprising:
a controller programmed to,
in response to a decreasing drive wheel torque command during a regenerative braking event, adjust a closed-state torque capacity of a torque converter bypass clutch, disposed between an electric machine and a drive wheel, based on the torque command and in proportion to negative values of the torque command, wherein the drive wheel torque command is filtered by an anti-jerk torque control algorithm, and
in response to an unfiltered drive wheel torque command becoming negative while the filtered drive wheel torque command remains positive during a first period, decrease the torque capacity of the bypass clutch to a minimum closed-state value.

2. The vehicle system of claim 1, wherein the controller is programmed to, in response to an increasing negative value of the torque command, increase the torque capacity of the bypass clutch.

3. The vehicle system of claim 1, wherein the controller is programmed to, in response to a decreasing negative value of the torque command, decrease the torque capacity of the bypass clutch.

4. The vehicle system of claim 1, wherein the controller is programmed to, in response to increasing a negative value of the filtered drive wheel torque command at a first rate during a period of lash crossing of the powertrain that follows the first period, increase the torque capacity of the bypass clutch from the minimum closed-state value at a second rate.

5. The vehicle system of claim 4, wherein the controller is programmed to, in response to increasing the negative value of the filtered drive wheel torque command at a third rate that is greater than the first rate during a third period that follows the period of lash crossing of the powertrain, increase the torque capacity of the bypass clutch at a fourth rate that is greater than the second rate.

6. The vehicle system of claim 1, wherein the controller is programmed to, in response to releasing an accelerator pedal prior to the regenerative braking event, decrease the torque capacity of the bypass clutch to a minimum closed-state value.

7. A vehicle comprising:
a powertrain configured to transfer kinetic energy to an electric machine to charge a battery during regenerative braking;
a clutch disposed between the electric machine and a drive wheel; and
a controller programmed to,
in response to a negative drive wheel torque command during a regenerative braking event, adjust a closed-state torque capacity of the clutch based on the torque command, wherein the drive wheel torque command is filtered by an anti-jerk torque control algorithm, and
in response to an unfiltered drive wheel torque command becoming negative while the filtered drive wheel torque command remains positive during a first period, decrease the torque capacity of the clutch to a minimum closed-state value.

8. The vehicle of claim 7, wherein the controller is programmed to, in response to an increasing negative value of the torque command, increase the torque capacity of the clutch proportionally to the increasing negative value of the torque command.

9. The vehicle of claim 7, wherein the controller is programmed to, in response to a decreasing negative value of the torque command, decrease the torque capacity of the clutch proportionally to the decreasing negative value of the torque command.

10. The vehicle of claim 7, wherein the controller is programmed to, in response to increasing a negative value of the filtered drive wheel torque command at a first rate during a period of lash crossing of the powertrain that follows the first period, increase the torque capacity of the clutch from the minimum closed-state value at a second rate.

11. The vehicle of claim 10, wherein the controller is programmed to, in response to increasing the negative value of the filtered drive wheel torque command at a third rate that is greater than the first rate during a third period that follows the period of lash crossing of the powertrain, increase the torque capacity of the clutch at a fourth rate that is greater than the second rate.

12. The vehicle of claim 7 further comprising a transmission having a torque converter disposed between the electric machine and the drive wheel, wherein the clutch is a bypass clutch of the torque converter.

13. A vehicle comprising:
 an electric machine configured to recharge a battery via regenerative braking;
 a torque converter bypass clutch disposed between the electric machine and a drive wheel; and
 a controller programmed to,
  in response to a negative drive wheel torque command during a regenerative braking event, adjust a closed-state torque capacity of the clutch based on the torque command, wherein the drive wheel torque command is filtered by an anti-jerk torque control algorithm, and
  in response to an unfiltered drive wheel torque command becoming negative while the filtered drive wheel torque command remains positive during a first period, decrease the torque capacity of the bypass clutch to a minimum closed-state value.

14. The vehicle of claim 13, wherein the controller is programmed to, in response to an increasing negative value of the torque command, increase the torque capacity of the bypass clutch proportionally to the increasing negative value of the torque command.

15. The vehicle of claim 13, wherein the controller is programmed to, in response to a decreasing negative value of the torque command, decrease the torque capacity of the bypass clutch proportionally to the decreasing negative value of the torque command.

16. The vehicle of claim 13, wherein the controller is programmed to, in response to increasing a negative value of the filtered drive wheel torque command at a first rate during a period of lash crossing of the powertrain that follows the first period, increase the torque capacity of the bypass clutch from the minimum closed-state value at a second rate that is proportional to the first rate.

17. The vehicle of claim 16, wherein the controller is programmed to, in response to increasing the negative value of the filtered drive wheel torque command at a third rate that is greater than the first rate during a third period that follows the period of lash crossing of the powertrain, increase the torque capacity of the bypass clutch at a fourth rate that both proportional to the third rate and greater than the second rate.

* * * * *